US010827205B2

(12) United States Patent
Wang (10) Patent No.: US 10,827,205 B2
(45) Date of Patent: Nov. 3, 2020

(54) VIDEO DATA STORAGE SYSTEM, OPERATION METHOD THEREOF, AND RETRIEVAL SERVER

(71) Applicant: Hangzhou Hikvision Digital Technology Co., Ltd., Hangzhou, Zhejiang (CN)

(72) Inventor: Wei Wang, Zhejiang (CN)

(73) Assignee: Hangzhou Hikvision Digital Technology Co., Ltd., Hangzhou, Zhejiang (CN)

(*) Notice: Subject to any disclaimer, the term of this patent is extended or adjusted under 35 U.S.C. 154(b) by 217 days.

(21) Appl. No.: 16/305,607

(22) PCT Filed: Feb. 8, 2017

(86) PCT No.: PCT/CN2017/073098
§ 371 (c)(1),
(2) Date: Nov. 29, 2018

(87) PCT Pub. No.: WO2017/206539
PCT Pub. Date: Dec. 7, 2017

(65) Prior Publication Data
US 2020/0280748 A1    Sep. 3, 2020

(30) Foreign Application Priority Data

May 31, 2016 (CN) .......................... 2016 1 0380337

(51) Int. Cl.
*H04N 21/231* (2011.01)
*H04N 21/232* (2011.01)
(Continued)

(52) U.S. Cl.
CPC ... *H04N 21/23116* (2013.01); *H04L 67/1097* (2013.01); *H04N 21/232* (2013.01); *H04N 21/23113* (2013.01); *H04N 21/24* (2013.01)

(58) Field of Classification Search
None
See application file for complete search history.

(56) References Cited

U.S. PATENT DOCUMENTS 10,032,483 B2 * 7/2018 Ryu .................. H04N 21/8549
2009/0193064 A1   7/2009 Chen et al.
(Continued)

FOREIGN PATENT DOCUMENTS

CN   102769666 A   11/2012
CN   103200272 A    7/2013
(Continued)

OTHER PUBLICATIONS

First Office Action for priority Chinese Application No. 201610380337.9 dated May 4, 2018, 8 pages, with an English summary.
(Continued)

*Primary Examiner* — Alexander Q Huerta
(74) *Attorney, Agent, or Firm* — Bret E. Field; Bozicevic, Field & Francis LLP (57) ABSTRACT

The present disclosure provides a video data storage system, an operation method thereof, and a retrieval server. The video data storage system according to present disclosure includes an index server and at least two storage servers for storing video data. The index server stores a first mapping relationship between a camera identification code and a storage server identification code. Each of the storage server stores a second mapping relationship among a camera identification code, a time range of video data and a physical location of video data in the storage server. The operation method includes: making, by the index server, statistics of an operation hot value of video data operated by all clients, and determining the operation hot value of the video data is greater than a predetermined first threshold; if yes, sending, by the index server, a backup instruction to at least one storage server, to instruct the storage server to back up the (Continued)

video data and update the second mapping relationship. The present disclosure can protect the hottest data using a minimum amount of capacity and bandwidth.

12 Claims, 6 Drawing Sheets

(51) Int. Cl.
  *H04N 21/24* (2011.01)
  *H04L 29/08* (2006.01)

(56) References Cited

U.S. PATENT DOCUMENTS

| | | | | |
|---|---|---|---|---|
| 2010/0321183 | A1* | 12/2010 | Donovan | H04N 5/23206 340/540 |
| 2012/0179742 | A1* | 7/2012 | Acharya | G08G 1/0175 709/202 |
| 2014/0324627 | A1* | 10/2014 | Haver | G06Q 30/0273 705/26.9 |
| 2014/0364223 | A1 | 12/2014 | Dietrich et al. | |
| 2016/0205341 | A1* | 7/2016 | Hollander | H04N 7/015 375/240.08 |
| 2017/0046230 | A1* | 2/2017 | Guzik | H04N 5/23206 |
| 2020/0145590 | A1* | 5/2020 | Elboher | G06K 9/00758 |
| 2020/0244927 | A1* | 7/2020 | Renkis | G08B 13/00 |

FOREIGN PATENT DOCUMENTS

| | | |
|---|---|---|
| CN | 103974138 A | 8/2014 |
| CN | 105430423 A | 3/2016 |

OTHER PUBLICATIONS

Extended European Search Report for European Application No. 17805486.2 dated Jan. 30, 2019, 9 pages.

* cited by examiner

VIDEO DATA STORAGE SYSTEM, OPERATION METHOD THEREOF, AND RETRIEVAL SERVER

The present disclosure claims the priority to a Chinese patent application No. 201610380337.9 filed with the China National Intellectual Property Administration on May 31, 2016 and entitled "VIDEO DATA STORAGE SYSTEM, OPERATION METHOD THEREOF, AND INDEX SERVER", which is incorporated herein by reference in its entirety.

TECHNICAL FIELD

The present disclosure relates to the field of video monitoring, and specifically to a video data storage system, an operation method thereof, and an index server.

BACKGROUND

At present, the video cloud storage technology has already been used increasingly widely. The video cloud storage technology can combine a number of storage devices in the network to work together, so as to provide externally the storage and access of video data, through technologies such as clustering applications and distributed file systems.

In practice, the amount of monitored video data is very large, but its value density is very low. Currently, a video data backup method usually used is to specify the number of redundant copies while video data is being written. The foregoing method causes a large amount of redundant video data without use value to occupy a large amount of storage space and bandwidth resources, which affects the utilization efficiency of resources.

At the same time, in a current cloud storage scheme of the monitored video data, index information of all video data is usually recorded in an index server. With the hot of high-definition video monitoring application and the expansion of the capacity of a single storage server, this method not only causes the increase of the pressure of the index server managing the storage server and index records so that the index server is overloaded, but also causes the reduction of retrieval efficiency.

SUMMARY

An object of the present disclosure is to provide a video data storage system and an operation method thereof, and an index server, which can improve the utilization efficiency of resources of the video data storage system and better ensure the security of the video data.

In a first aspect of the present disclosure, there is provided a method of operating a video data storage system. The video data storage system includes an index server and at least two storage servers for storing video data. The index server stores a first mapping relationship between a camera identification code and a storage server identification code, and each of the storage servers stores a second mapping relationship among a camera identification code, a time range of video data and a physical location of the video data in the storage server. The method includes:

making, by the index server, statistics of an operation hot value of video data operated by all clients, according to operation requests from all the clients for the video data;

comparing, by the index server, the operation hot value of the video data with a predetermined first threshold, and if the operation hot value of the video data is larger than the first threshold, sending, by the index server, at least one storage server a backup instruction to instruct the storage server to back up the video data and update the second mapping relationship;

updating, by the index server, the first mapping relationship according to a camera identification code corresponding to the video data and a storage server identification code of the storage server that backs up the video data.

In another embodiment of the present disclosure, the video data storage system comprises at least a first storage server and a second storage server, the first storage server corresponds to the first threshold, and the second storage server corresponds to a predetermined second threshold, wherein the second threshold is larger than the first threshold, and a cyclic overwriting period of the second storage server is longer than a cyclic overwriting period of the first storage server; and wherein sending, by the index server, at least one storage server a backup instruction includes:

if the operation hot value of the video data is larger than the second threshold, sending, by the index server, the second storage server an instruction for backing up the video data and updating the second mapping relationship; or if the operation hot value of the video data is not larger than the second threshold, sending, by the index server, the first storage server an instruction for backing up the video data and updating the second mapping relationship.

In another embodiment of the present disclosure, the method further includes:

receiving, by the index server, a retrieval request sent by a client for specified video data, the retrieval request including a camera identification code and a time range of the specified video data;

obtaining, by the index server, all target storage servers storing the specified video data, according to the camera identification code and the first mapping relationship;

sending, by the index server, a retrieval instruction to all the target storage servers, to instruct all the target storage servers to retrieve the specified video data according to the camera identification code, the time range of the specified video data, and the second mapping relationship, respectively; and de-duplicating, by the index server, retrieval results returned by all the target storage servers, and outputting a de-duplicated retrieval result.

In another embodiment of the present disclosure, types of the operation requests from all the clients for the video data includes, but are not limited to, one of or any combination of: retrieval, locking, labelling, downloading, and playback.

In another embodiment of the present disclosure, making, by the index server, statistics of an operation hot value of video data operated by all clients, according to operation requests from all the clients for the video data includes:

making, by the index server, statistics of operation types and the number of operations of the video data operated by all the clients according to the operation requests from all the clients for the video data, and obtaining the operation hot value of the video data through a weighted average algorithm.

In a second aspect of the present disclosure, there is provided a video data storage system, including an index server and at least two storage servers, wherein the index server stores a first mapping relationship between a camera identification code and a storage server identification code, and each of the storage servers stores a second mapping relationship among a camera identification code, a time range of video data and a physical location of the video data in the storage server;

the index server includes:

a statistics module configured for making statistics of an operation hot value of video data operated by all clients, according to operation requests from all the clients for the video data;

a backup module configured for comparing the operation hot value of the video data with a predetermined first threshold, and if the operation hot value of the video data is larger than the first threshold, sending at least one storage server a backup instruction to instruct the storage server to back up the video data and update the second mapping relationship; and a first update module configured for updating the first mapping relationship according to a camera identification code corresponding to the video data and a storage server identification code of the storage server that backs up the video data.

Each of the storage server includes:

a storage module configured for storing the video data according to the backup instruction of the backup module; and a second update module configured for updating the second mapping relationship according to the backup instruction of the backup module.

In another embodiment of the present disclosure, the video data storage system includes at least a first storage server and a second storage server, the first storage server corresponds to the first threshold, and the second storage server corresponds to a predetermined second threshold, wherein the second threshold is larger than the first threshold, and a cyclic overwriting period of the second storage server is longer than a cyclic overwriting period of the first storage server, and the backup module is further configured for: when the operation hot value of the video data is larger than the first threshold, if the operation hot value of the video data is larger than the second threshold, sending the second storage server an instruction for backing up the video data and updating the second mapping relationship; or if the operation hot value of the video data is not larger than the second threshold, sending the first storage server an instruction for backing up the video data and updating the second mapping relationship.

In another embodiment of the present disclosure, the index server further includes:

a receiving module configured for receiving a retrieval request sent by a client for specified video data, the retrieval request including a camera identification code and a time range of the specified video data;

a first retrieval module configured for obtaining all target storage servers storing the specified video data, according to the camera identification code and the first mapping relationship, and sending a retrieval instruction to all the target storage servers;

an output module configured for de-duplicating retrieval results returned by all the target storage servers, and outputting a de-duplicated retrieval result;

Each of the storage servers further comprises:

a second retrieval module configured for receiving the retrieval instruction of the index server, retrieving the specified video data according to the camera identification code, the time range of the specified video data and the second mapping relationship, and sending a retrieval result to the output module of the index server.

In a third aspect of the present disclosure, there is provided an index server connected to at least two storage servers. The index server stores a first mapping relationship between a camera identification code and a storage server identification code, and each of the storage servers stores a second mapping relationship among a camera identification code, a time range of video data and a physical location of the video data in the storage server.

The index server includes:

a statistics module configured for making statistics of an operation hot value of video data operated by all clients, according to operation requests from all the clients for the video data;

a backup module configured for comparing the operation hot value of the video data with a predetermined first threshold, and if the operation hot value of the video data is larger than the first threshold, sending at least one storage server a backup instruction to instruct the storage server to back up the video data and update the second mapping relationship; and a first update module configured for updating the first mapping relationship according to a camera identification code corresponding to the video data and a storage server identification code of the storage server that backs up the video data.

In another embodiment of the present disclosure, the index server is connected to a first storage server and a second storage server, wherein the first storage server corresponds to the first threshold, and the second storage server corresponds to a predetermined second threshold; the second threshold is larger than the first threshold, and a cyclic overwriting period of the second storage server is longer than a cyclic overwriting period of the first storage server; and the backup module is further configured for: when the operation hot value of the video data is larger than the first threshold, if the operation hot value of the video data is larger than the second threshold, sending the second storage server an instruction for backing up the video data and updating the second mapping relationship; or if the operation hot value of the video data is not larger than the second threshold, sending the first storage server an instruction for backing up the video data and updating the second mapping relationship.

In another embodiment of the present disclosure, the index server further includes a receiving module configured for receiving a retrieval request sent by a client for specified video data, the retrieval request including a camera identification code and a time range of the specified video data;

a first retrieval module configured for obtaining all target storage servers storing the specified video data, according to the camera identification code and the first mapping relationship, and sending a retrieval instruction to all the target storage servers; and an output module configured for de-duplicating retrieval results returned by all the target storage servers, and outputting a de-duplicated retrieval result.

In a fourth aspect of the present disclosure, there is provided an application program which performs the method of operating a video data storage system provided by the embodiments of the present disclosure when being executed.

In a fifth aspect of the present disclosure, there is provided a storage medium for storing an executable program code, wherein the executable program code performs the method of operating a video data storage system provided by the embodiments of the present disclosure when being executed.

The embodiments of the present disclosure at least have the following effect and difference from the prior art.

Real-time statistics is made on the operation requests of the client for the video data, and the hot video data is selectively backed up. This greatly reduces the cost of the backup of the video data, and relieves the pressure of the capacity and bandwidth resources of the system. Furthermore, this ensures the security of the hot video data, and improves the utilization efficiency of the system resources.

With the distributed index structure, the index server only stores a first mapping relationship between a camera identification code and a storage server identification code, and the storage server stores a second mapping relationship among a camera identification code, a time range of video data, and a physical location of the video data in the storage server. This achieves the management of a larger cluster of storage devices with a minimum number of index servers, significantly reducing the cost and improving the retrieval efficiency.

It should be appreciated that within the scope of the present disclosure, various technical features mentioned above and various technical features specifically described below (e.g., in the embodiments) may be combined with each other to constitute a new or preferred technical solution. For clarity, this is not described in detail here.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

Through extensive and in-depth research, the inventor proposes a solution for selectively backing up key video data according to an operation hot value of video data operated by a client, and storing video data with a larger hot value in a storage server with a longer cyclic overwriting period. Further, the distributed indexing and retrieval is provided on the index server and the storage server, thereby more effectively utilizing system resources and better ensuring the security of the video data.

In the following description, many technical details are set forth in order to enable readers to better understand the present disclosure. However, those skilled in the art can understand that the technical solutions claimed in the claims of the present disclosure can be implemented without these technical details and based on various changes and modifications of the following embodiments.

Embodiments of the present disclosure will be further described in detail below with reference to the accompanying drawings.

Figure 1:
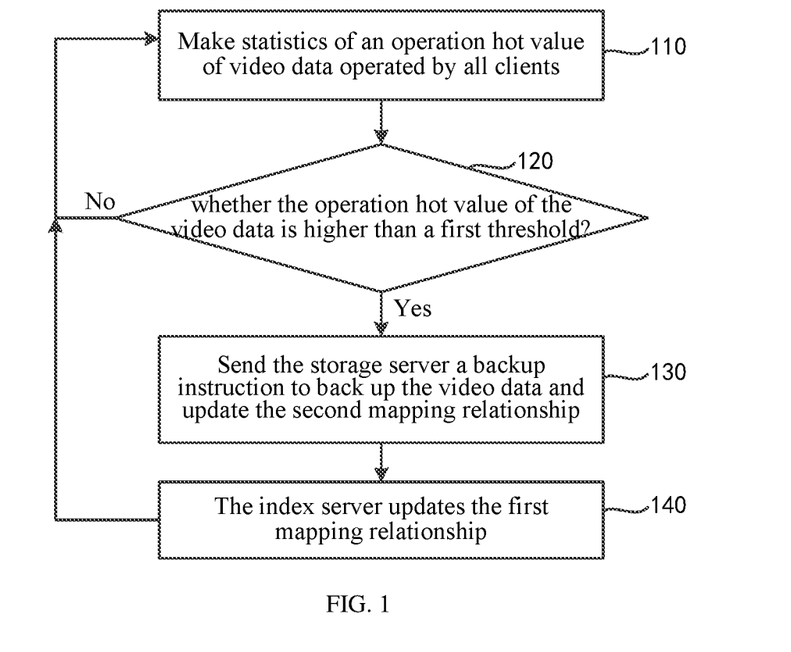
FIG. 1 is a flowchart of a method for backing up video data according to a first embodiment of the present disclosure.
Figure 2:
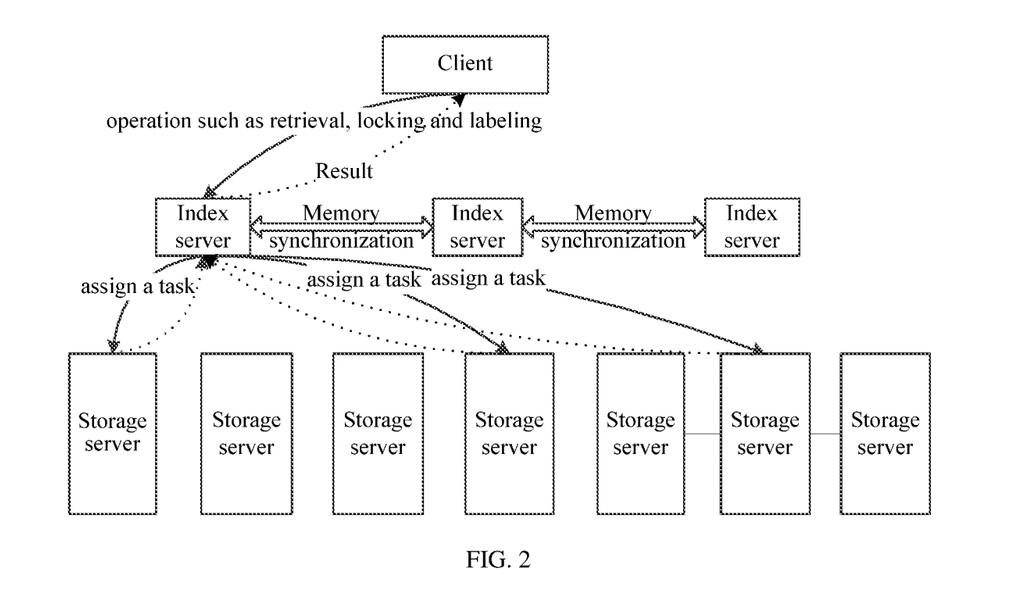
FIG. 2 is a schematic diagram of making statistics of an operation hot value of video data operated by clients according to an embodiment of the present disclosure.
Figure 3:
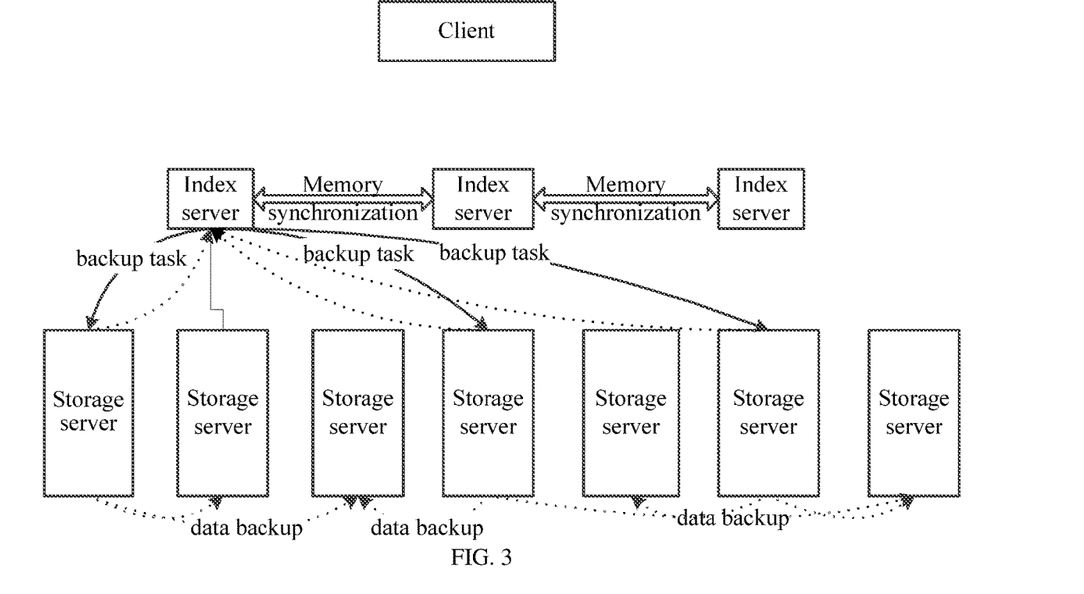
FIG. 3 is a schematic diagram of making statistics of an operation hot value of video data operated by clients according to an embodiment of the present disclosure.
Figure 4:
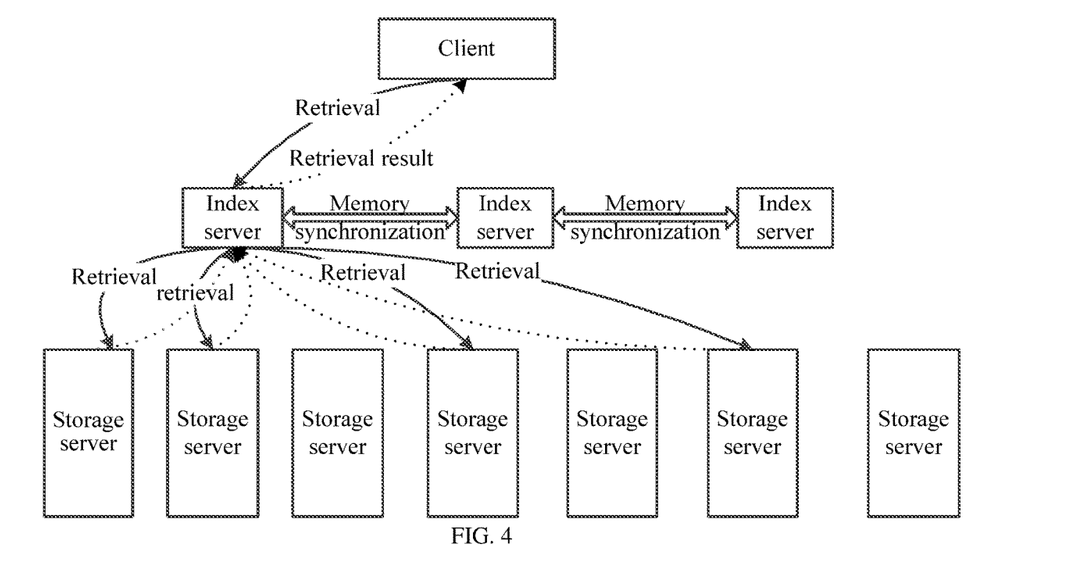
FIG. 4 is a schematic diagram of making statistics of an operation hot value of video data operated by clients according to an embodiment of the present disclosure.

In the present embodiment, the video data storage system includes an index server and at least two storage servers (see FIGS. 2-4).

The index server can manage the storage servers, allocate storage resources, record a physical location of video data, respond to a request of a client, and so on. The index server may be deployed in a mode of HA (High Availability) dual-machine or cluster, to provide service externally in a load balancing mode. The index server stores a first mapping relationship between a camera identification code (i.e., an encoder ID (Identification)) and a storage server identification code, and the camera identification code is a unique identification code of the camera.

The storage server is configured to store video data, and store a second mapping relationship among a camera identification code, a time range of the video data, and a physical location of the video data in the storage server. Camera identification code-start time-end time is an index record format of the video data.

Referring to FIG. 1 to FIG. 6, the operation method of the video data storage system of this embodiment includes the following steps.

At step 110, the index server makes statistics of an operation hot value of video data operated by all clients, according to operation requests from all the clients for the video data (see FIG. 2).

Figure 5:
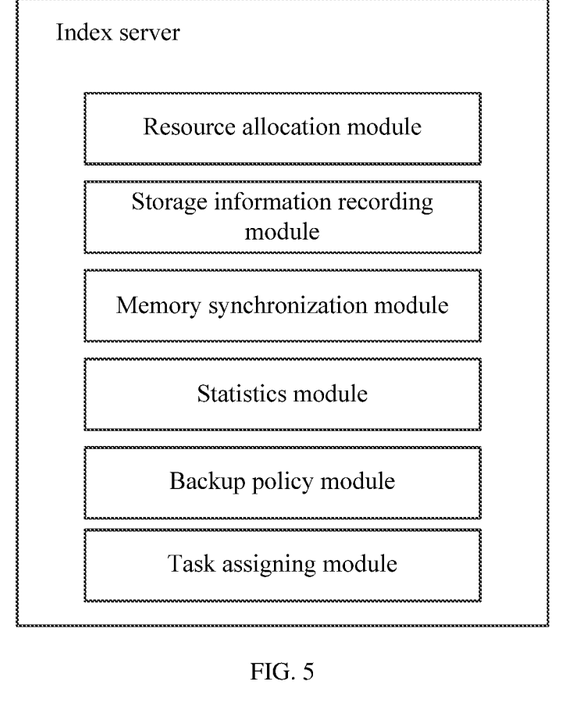
FIG. 5 is a schematic diagram of an index server according to an embodiment of the present disclosure.
Figure 6:
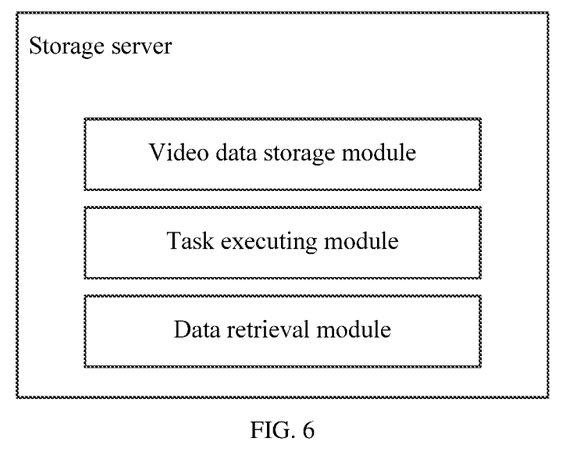
FIG. 6 is a schematic diagram of a storage server according to an embodiment of the present disclosure.

Specifically, this step mainly makes statistics of the behaviors of the clients, namely, the operation requests of the clients for the video data to obtain the operation hot value, and synchronizes it to other index servers in the cloud through a memory synchronization module (see FIG. 5). The index server includes a resource allocation module, a storage information recording module, a memory synchronization module, a statistics module, a backup policy module, and a task assigning module. Different modules perform different functions. For example, the storage information recording module is configured to store the first mapping relationship between a camera identification code and a storage server identification code, the statistics module is configured to makes statistics of the operation hot value of the video data operated by all the clients, according to the operation requests from all the clients for the video data, and so on.

In the present disclosure, a type of an operation request from a client for the video data includes, but is not limited to, one of or any combination of: retrieval, locking, labelling, downloading, and playback. It should be appreciated that the locking refers to lock protection for preventing video data from being deleted due to automatic overwriting. The labelling includes favoriting the video data or labelling the video data, or labelling in other forms.

In addition, those skilled in the art may appreciate that the index server makes stasticis of the operation hot value, according to the operation requests of the clients for a segment of video data that is captured by a camera having a certain camera identification code in a certain time range.

In the present disclosure, there are various statistical methods for the operation hot value. For example, in the embodiment, it is possible to first make statistics of operation types and the number of operations of video data operated by all the clients, and then obtain an operation hot value of the video data by a weighted average algorithm. An operation type of video data operated by a client is a type of an operation request from the client for the video data. For example, the operation hot value can be calculated according to the following formula:

$$H=W1*N1+W2*N2+W3*N3+W4*N4$$

wherein, H represents a hot value; Wx and Nx respectively represent a weight and the number of operations for a client's operation request for video data. It should be appreciated that the weight for the client's operation request for the video data is a weight corresponding to the type of the client's operation request for the video data.

A backup condition is H≥M, where M is a first threshold. In the present embodiment, a default value of M is 4.

It should be noted that after a backup task is generated, the statistics of the behaviors and the operation hot value are cleared (i.e., the hot value is removed).

More specifically, the weight Wx of the client's operation request may be set as needed, for example, a weight of the downloading is the lowest and is 1; a weight of the playback is next to the weight of the downloading and is 2; a weight of the locking and labelling is the highest and is 4.

Those skilled in the art may appreciate that in other embodiments of the present disclosure, the operation hot value may also be calculated in other methods as needed.

At step 120: the index server determines whether the operation hot value of the video data is greater than a predetermined first threshold. If so, step 130 is performed; otherwise, it is returned to step 110.

At step 130, the index server sends a backup instruction to at least one storage server, to instruct the storage server to back up the video data and update the second mapping relationship (see FIG. 3). Specifically, the backup instruction includes a camera identification code and a time range of the specified video data, and a task executing module (see FIG. 6) of the storage server completes the backup of the specified video data according to the backup instruction. The storage server includes a video data storage module, a task executing module and a data retrieval module. Different modules perform different functions. For example, the video data storage module is used to store video data, the data retrieval module is used to retrieve video data, and so on.

Thus, when the operation hot value of the video data is larger than the predetermined first threshold, the video data is stored in the at least two storage servers by the backup, ensuring the safety of hot video data, namely, video data whose operation hot value is larger than the predetermined first threshold. It should be appreciated that, in other embodiments of the present disclosure, video data that is particularly important, for example, video data whose operation hot value is larger than a predetermined third threshold, may also be copied to a plurality of different storage servers. The predetermined third threshold is much larger than the predetermined first threshold.

It should be appreciated that in performing the backup task by the storage server, the index server may inform the backed-up storage server to copy the data to another specified storage server, or the index server may inform a target storage server receiving the backup data, to actively acquire specified data from a source storage server, namely, the server in which the data was originally stored.

Further, in the present embodiment, step 130 includes:

dividing video data into a plurality of slices and storing separately the slices in a plurlaity of storage servers;

backing up each slice of the video data into a storage server different from the storage server in which the slice is originally stored; and updating storage information of the video data according to the storage of the slices.

When the video data is stored, the video data can be divided into the plurality of slices and the slices are stored separately into the plurality of storage servers. Therefore, in the embodiment, the step 130 may include:

backing up each slice of the video data into a storage server different from the storage servers in which the slice is originally stored;

updating storage information of the video data according to the storage of the slices.

The hot video data are stored separately in the plurality of storage severs in a form of slice. When the video data is read, the plurality of storage servers simultaneously provide data, which can speed up data reading.

At step 140, the index server updates the first mapping relationship according to a camera identification code corresponding to the video data and a storage server identification code of the storage server that backs up the video data.

The first embodiment has the following advantages.

Real-time statistics is made on the operation requests of the clients for the video data, and the hot video data is selectively backed up. This greatly reduces the cost of the backup of the video data, and relieves the pressure of the capacity and bandwidth resources of the system. Furthermore, this ensures the security of the hot video data, and improves the utilization efficiency of the system resources.

On the basis of the video data storage system of the first embodiment, the second embodiment of the present disclosure further includes at least a first storage server and a second storage server.

Specifically, the first storage server corresponds to the first threshold, and the second storage server corresponds to a predetermined second threshold. The second threshold is larger than the first threshold, and a cyclic overwriting period of the second storage server is longer than that of the first storage server.

Figure 7:
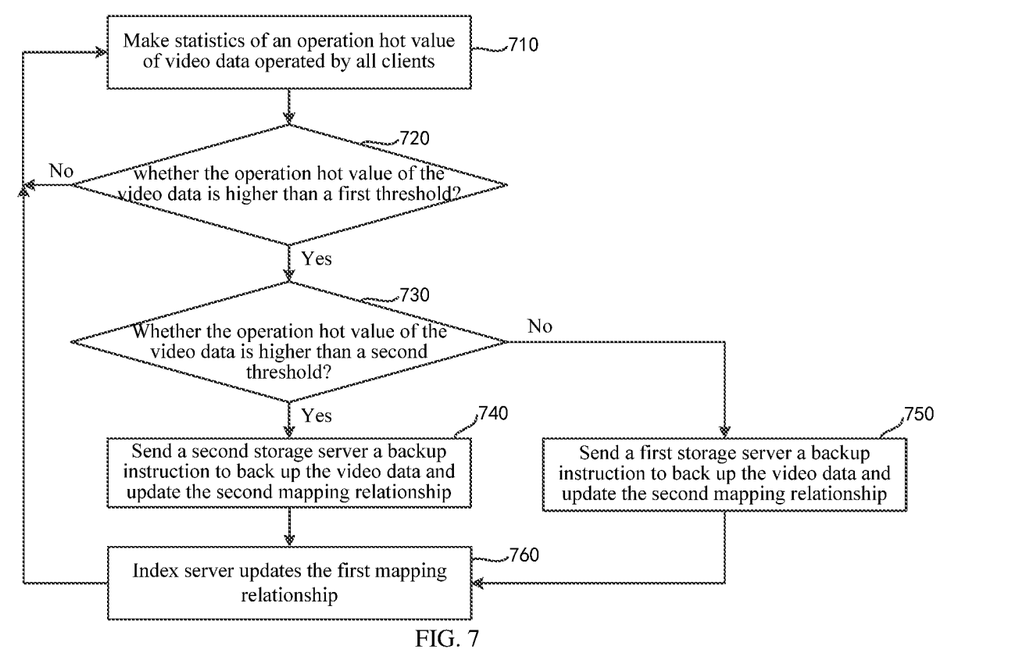
FIG. 7 is a flowchart of a method for backing up video data according to a second embodiment of the present disclosure.

Referring to FIG. 7, the method of operating the video data storage system of the embodiment includes the following steps.

At step 710, the index server makes statistics of an operation hot value of the video data operated by all clients, according to operation requests from all the clients for video data.

This step corresponds to step 110 in the first embodiment, which is not described in detail herein.

At step 720, the index server determines whether the operation hot value of the video data is greater than a predetermined first threshold. If yes, step 730 is performed, otherwise, it is returned to step 710.

At step 730, the index server determines whether the operation hot value of the video data is larger than a second threshold. If yes, step 740 is performed; otherwise, it is returned to step 750.

At step 740, the index server sends the second storage server an instruction for backing up the video data and updating the second mapping relationship.

At step 750, the index server sends the first storage server an instruction for backing up the video data and updating the second mapping relationship.

At step 760, the index server updates the first mapping relationship according to a camera identification code corresponding to the video data and a storage server identification code of the storage server for backing up the video data.

The advantages of the second embodiment are as follows:

The video data with larger operation hot value is stored on the storage server with a longer cyclic overwriting period, which optimizes the utilization efficiency of the storage server and improves the security of the hot video data.

Figure 8:
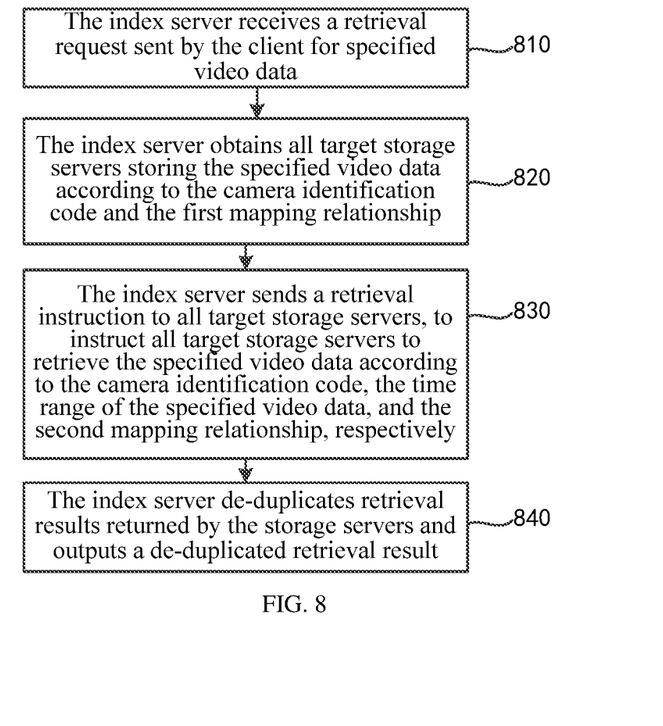
FIG. 8 is a flowchart of a method for backing up video data according to a third embodiment of the present disclosure.

Referring to FIG. 4 and FIG. 8, the method of operating a video data storage system according to the third embodiment of the present disclosure is based on the foregoing first or second embodiment, and further includes the following steps.

At step 810, the index server receives a retrieval request sent by the client for specified video data, wherein the retrieval request includes a camera identification code and a time range of the specified video data.

At step 820, the index server obtains all target storage servers storing the specified video data according to the camera identification code and the first mapping relationship.

At step 830, the index server sends a retrieval instruction to all the target storage servers, to instruct all the target storage servers to retrieve the specified video data according to the camera identification code, the time range of the specified video data, and the second mapping relationship, respectively.

At step 840, the index server de-duplicates retrieval results returned by all the storage servers, and outputs a de-duplicated retrieval result. It should be noted that, as described above, the video data is stored separately in a plurality of storage servers in a form of slice. Therefore, the index server sorts the retrieval results returned by the storage servers in a chronological order, and uses the sorted video data as a retrieval result. In the present disclosure, in order to store the hot data in multiple copies, the hot data is distributed in a plurality of storage servers in a form of slice. In this case, when the video data is to be retrieved, multiple storage servers can provide data simultaneously, thereby speeding up data reading and ensure continuity in data download and playback.

The advantages of the third embodiment are as follows.

With the distributed index structure, the index server only stores a first mapping relationship between a camera identification code and a storage server identification code, and the storage server stores a second mapping relationship among a camera identification code, a time range of video data, and a physical location of the video data in the storage server. This achieves the management of a larger cluster of storage devices with a minimum number of index servers, significantly reducing the cost and improving the retrieval efficiency.

Those skilled in the art may appreciate that in other embodiments of the present disclosure, the above steps may also be used in conjunction with other embodiments of the present disclosure.

Figure 9:
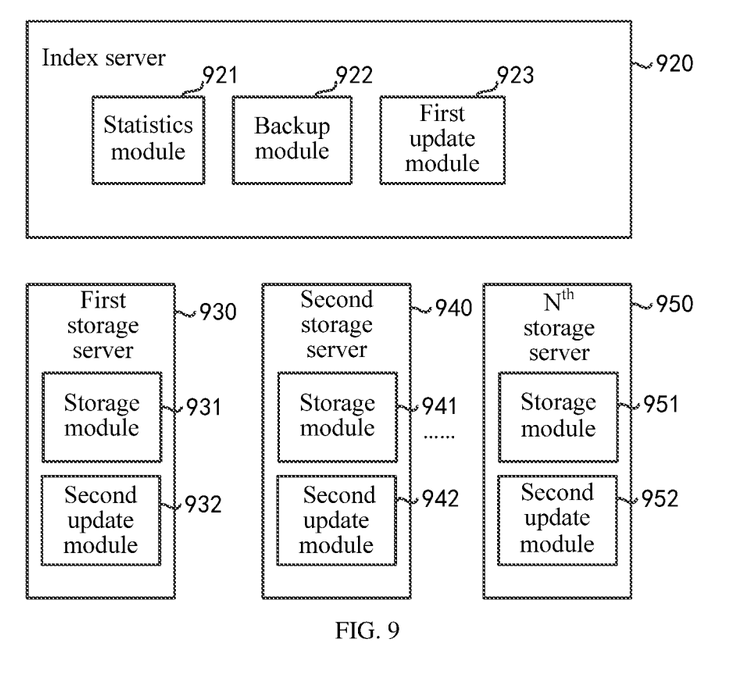
FIG. 9 is a schematic diagram of a video data storage system according to a fourth embodiment of the present disclosure.

Referring to FIG. 9, a video data storage system of the fourth embodiment of the present disclosure includes an index server 920 and at least two storage servers, namely, a first storage server 930 and a second storage server 940. The at least two storage servers may further include other storage servers, for example, the $N^{th}$ storage server 950. The index server 920 stores a first mapping relationship between a camera identification code and a storage server identification code. Each of the first storage server 930, the second storage server 940, and the Nth storage server 950 stores a second mapping relationship among a camera identification code, a time range of video data, and a physical location of the video data in the storage server. The index server 920 includes a statistics module 921, a backup module 922, and a first update module 923. The first storage server 930 includes a storage module 931 and a second update module 932. The second storage server 940 includes a storage module 941 and a second update module 942. Similarly, the $N^{th}$ storage server 950 includes a storage module 951 and a second update module 952.

Further, in the index server 920, the statistics module 921 is configured for making statistics of an operation hot value of video data operated by all clients, according to operation requests from all the clients for the video data. The backup module 922 is configured for comparing the operation hot value of the video data with a predetermined first threshold. If the operation hot value of the video data is larger than the first threshold, the backup module 922 sends a backup instruction to at least one of the first storage server 930 and the second storage servers 940, to instruct the at least one of the first storage server 930 and the second storage servers 940 to back up the video data and update the second mapping relationship. The first update module 923 is configured for updating the first mapping relationship according to a camera identification code corresponding to the video data and a storage server identification code of the storage server that backs up the video data. In the first storage server 930 or the second storage server 940, the storage module 931 or the storage module 941 is configured for storing the video data according to the backup instruction of the backup module 922, and the second update module 932 or the second update module 942 is configured for updating the second mapping relationship according to the backup instruction of the backup module 922.

The video data backup process of the video data storage system of the present embodiment will be briefly described below.

The index server 920 makes statistics of the operation hot value of the video data operated by all the clients, according to the operation requests from all the clients for the video data, and determines whether the operation hot value of the video data is greater than the predetermined first threshold. If yes, which indicates that the video data is the hot video data, the index server 920 sends a backup instruction to at least one of the first storage server 930 and the second storage server 940, to instruct the storage server to back up the video data and update the second mapping relationship. Accordingly, the index server 920 updates the first mapping relationship according to a camera identification code corresponding to the video data and a storage server identification code of the storage server that backs up the video data.

The advantages of the fourth embodiment are as follows.

The video data storage system makes real-time statistics of the operation requests from the clients for the video data, and selectively backs up the hot video data. This greatly reduces the cost of the backup of video data, and relieves the pressure of the capacity and bandwidth resources of the system. Furthermore, this ensures the security of the hot video data, and improves the utilization efficiency of system resources.

In another embodiment of the present disclosure, video data that is more important may be further stored in a storage server having a longer cyclic overwriting period according to the operation hot value.

Specifically, on the basis of the fourth embodiment, the video data storage system includes at least a first storage server 930 and a second storage server 940. The first storage server 930 corresponds to a first threshold, and the second storage server 940 corresponds to a predetermined second threshold. The second threshold is larger than the first threshold, and a cyclic overwriting period of the second storage server 940 is longer than a cyclic overwriting period of the first storage server 930. In this case, the backup module 922 of the index server 920 determines whether the operation hot value of the video data is larger than the second threshold; if yes, sends the second storage server 940 an instruction for backing up the video data and updating the second mapping relationship; or if not, sends the first storage server 930 an instruction for backing up the video data and updating the second mapping relationship.

The advantages of the above embodiment are as follows.

The video data with larger operation hot value is stored on the storage server with a longer cyclic overwriting period, which optimizes the utilization efficiency of the storage server and improves the security of the hot video data.

In another embodiment of the present disclosure, indexing efficiency is further improved by distributed indexing.

Figure 10:
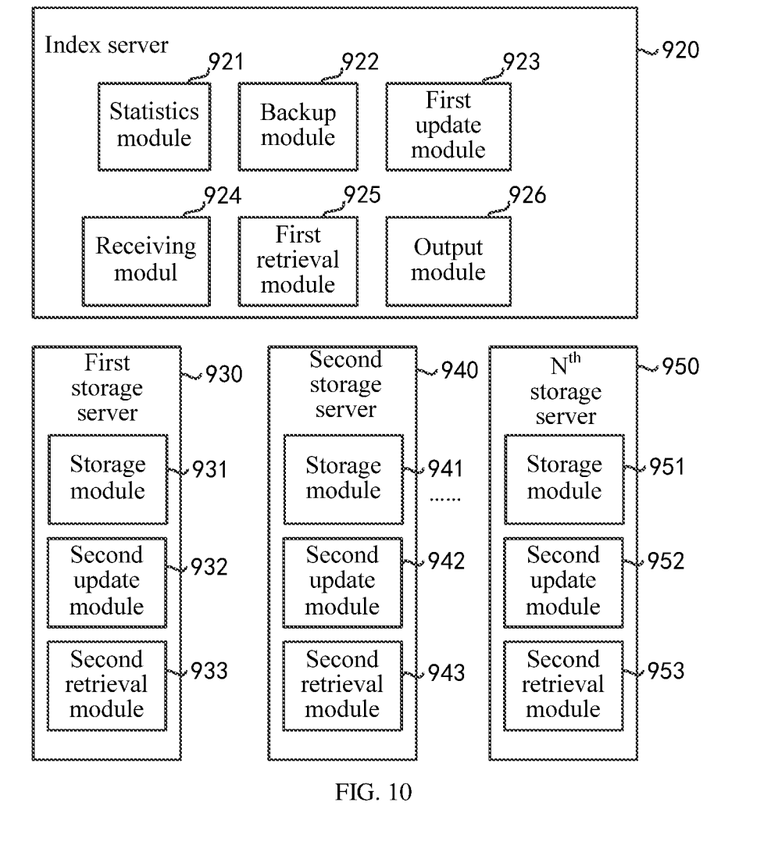
FIG. 10 is a schematic diagram of a video data storage system according to an embodiment of the present disclosure.

Specifically, as shown in FIG. 10, on the basis of the fourth embodiment, the index server 920 further includes a receiving module 924, a first retrieval module 925, and an output module 926. The first storage server 930 further includes a second retrieval module 933. The second storage module 940 further includes a second retrieval module 943. Similarly, the $N^{th}$ storage module 950 further includes a second retrieval module 953. In the index server 920, the receiving module 924 is configured for receiving a retrieval request sent by a client for specified video data. The retrieval request includes a camera identification code and a time range of the specified video data. The first retrieval module 925 is configured for obtaining all target storage servers storing the specified video data, according to the camera identification code and the first mapping relationship, and sending a retrieval instruction to all the target storage servers. The output module 926 is configured for de-duplicating retrieval results returned by all the target storage servers, and outputting a de-duplicated retrieval result. In the first storage server 930, the second retrieval module 933 is configured for receiving the retrieval instruction of the index server 920, retrieving the specified video data according to the camera identification code, the time range of the specified video data and the second mapping relationship, and sending a retrieval result to the output module 926 of the index server 920. The second retrieval module 943 in the second storage server 940 and the second retrieval module 953 in the $N^{th}$ storage server 950 are the same as the second retrieval module 933 in the first storage server 930, and are not described in detail herein.

The advantages of the above embodiment are as follows:

With the distributed index structure, the index server 920 only stores a first mapping relationship between a camera identification code and a storage server identification code; each of the first storage server 930, the second storage server 940 and the $N^{th}$ storage server 950 stores a second mapping relationship among a camera identification code, a time range of video data, and a physical location of the video data in the storage server. This achieves the management of a larger cluster of storage devices with a minimum number of index servers, significantly reducing the cost and improving the retrieval efficiency.

It should be appreciated by those skilled in the art that the embodiments of the video data operating system correspond to the embodiments of the method of operating the video data storage system above. They may cooperate with each other. The related technical details mentioned in the above method embodiments are still applied to the embodiments of the video data operating system, and are not described herein again in order to avoid repetition. Accordingly, the related technical details mentioned in the embodiment can also be applied to the above embodiments.

Referring to FIG. 9, the index server 920 of the fifth embodiment of the present disclosure is connected to at least two storage servers, namely, the first storage server 930 and the second storage server 940. The at least two storage servers may further include other storage servers, for example, the $N^{th}$ storage server 950. The index server 920 stores a first mapping relationship between a camera identification code and a storage server identification code. Each of the first storage server 930, the second storage server 940, and the Nth storage server 950 stores a second mapping relationship among a camera identification code, a time range of video data, and a physical location of the video data in the storage server. The index server 920 includes a statistics module 921, a backup module 922, and a first update module 923.

More specifically, the statistics module 921 is configured for making statistics of an operation hot value of video data operated by all clients, according to operation requests from all the clients for the video data. The backup module 922 is configured for comparing the operation hot value of the video data with a predetermined first threshold, and if the operation hot value of the video data is larger than the first threshold, sending at least one storage server a backup instruction to instruct the storage server to back up the video data and update the second mapping relationship. The first update module 923 is configured for updating the first mapping relationship according to a camera identification code corresponding to the video data and a storage server identification code of the storage server that backs up the video data.

The operation process of the index server 920 of the present embodiment will be briefly described below.

The index server 920 makes statistics of an operation hot value of video data operated by all clients, according to operation requests from all the clients for the video data, and determines whether the operation hot value of the video data is greater than a predetermined first threshold. If yes, the index server 920 sends a backup instruction to at least one of the first storage server 930, the second storage server 940, and the $N^{th}$ storage server 950 to instruct the storage server to back up the video data and update the second mapping relationship. Accordingly, the index server 920 updates the first mapping relationship according to a camera identification code corresponding to the video data and a storage server identification code of the storage server that backs up the video data.

The advantages of the fifth embodiment are as follows.

Real-time statistics is made on the operation requests of the clients for the video data, and the hot video data is selectively backed up. This greatly reduces the cost of the backup of the video data, and relieves the pressure of the capacity and bandwidth resources of the system. Furthermore, this ensures the security of the hot video data, and improves the utilization efficiency of the system resources.

It should be noted that in another embodiment of the present disclosure, video data that is more important may be further stored in a storage server having a longer cyclic overwriting period according to the operation hot value.

Specifically, on the basis of the fifth embodiment, the index server 920 is connected to the first storage server 930 and the second storage server 940. The first storage server 930 corresponds to a first threshold, and the second storage server 940 corresponds to a predetermined second threshold. The second threshold is larger than the first threshold. The cyclic overwriting period of the second storage server 940 is longer than the cyclic overwriting period of the first storage server 930. In this case, when the operation hot value of the video data is larger than the first threshold, the backup module 922 further determines whether the operation hot value of the video data is larger than the second threshold. If yes, the backup module 922 sends the second storage server 940 an instruction for backing up the video data and updating the second mapping relationship. If not, the backup module 922 sends the first storage server 930 an instruction for backing up the video data and updating the second mapping relationship.

The advantages of the above embodiment are as follows: the video data with larger operation hot value is stored on the storage server with a longer cyclic overwriting period, which optimizes the utilization efficiency of the storage server and improves the security of the hot video data.

In another embodiment of the present disclosure, indexing efficiency may also be further improved by distributed indexing.

Specifically, as shown in FIG. 10, the index server 920 further includes a receiving module 924, a first retrieval module 925, and an output module 926. The receiving module 924 is configured for receiving a retrieval request sent by a client for specified video data. The retrieval request includes a camera identification code and a time range of the specified video data. The first retrieval module 925 is configured for obtaining all target storage servers storing the specified video data, according to the camera identification code and the first mapping relationship, and sending a retrieval instruction to all the target storage servers. The output module 926 is configured for de-duplicating retrieval results returned by all the target storage servers, and outputting a de-duplicated retrieval result.

In this embodiment, the first storage server 930 further includes a second retrieval module 933, and the second storage module 940 further includes a second retrieval module 943. Similarly, the $N^{th}$ storage module 950 further includes a second retrieval module 953. In the first storage server 930, the second retrieval module 933 is configured to receive the retrieval instruction of the index server 920, retrieve the specified video data according to the camera identification code, the time range of the specified video data, and the second mapping relationship, and send a retrieval result to the output module 926 of the index server 920. The second retrieval module 943 in the second storage server 940 and the second retrieval module 953 in the $N^{th}$ storage server 950 are the same as the second retrieval module 933 in the first storage server 930, and are not described in detail herein.

The advantages of the above embodiment are as follows:

The retrieval server determines which storage server(s) stores the specified video data according to the camera identification code and the first mapping relationship, and then the storage server(s) retrieves the specified video data according to the information such as the camera identification code and the second mapping relationship. Therefore, it is possible to manage a large-scale storage and server cluster with a minimum number of index servers 920 and maintain a high retrieval efficiency.

It may be appreciated by those skilled in the art that the embodiments of the above retrieval server corresponds to the embodiments of the method of operating the video data storage system. They may cooperate with each other. The related technical details mentioned in the above embodiments are still applied to the embodiments of the video data operating system, and are not described herein again in order to avoid repetition. Accordingly, the related technical details mentioned in the present embodiment can also be applied to the above embodiments.

In summary, main advantages of the present disclosure include:

1) Real-time statistics is made on the operation requests of the client for the video data, and the hot video data is selectively backed up. This greatly reduces the cost of the backup of the video data, and relieves the pressure of the capacity and bandwidth resources of the system. Furthermore, this ensures the security of the hot video data, and improves the utilization efficiency of the system resources.

2) The video data with larger operation hot value is stored on the storage server with a longer cyclic overwriting period, which optimizes the utilization efficiency of the storage server and improves the data security of the hot video data.

3) With the distributed index structure, the index server only stores a first mapping relationship between a camera identification code and a storage server identification code, and the storage server stores a second mapping relationship among a camera identification code, a time range of video data, and a physical location of the video data in the storage server. This achieves the management of a larger cluster of storage devices with a minimum number of index servers, significantly reducing the cost and improving the retrieval efficiency.

4) The present disclosure exhibits a better extensibility and solves the storage and retrieval pressure applied by massive indexes to the index server.

An embodiment of the present disclosure provides an application program which performs the method of operating the video data storage system provided by the embodiments of the present disclosure when being executed. The video data storage system includes an index server and at least two storage servers for storing video data. The index server stores a first mapping relationship between a camera identification code and a storage server identification code. Each of the storage servers stores a second mapping relationship among a camera identification code, a time range of video data and a physical location of the video data in the storage server. The method may include:

making, by the index server, statistics of an operation hot value of video data operated by all clients, according to operation requests from all the clients for the video data;

comparing, by the index server, the operation hot value of the video data with a predetermined first threshold, and if the operation hot value of the video data is larger than the first threshold, sending, by the index server, at least one storage server a backup instruction to instruct the storage server to back up the video data and update the second mapping relationship;

updating, by the index server, the first mapping relationship according to a camera identification code corresponding to the video data and a storage server identification code of the storage server that backs up the video data.

The advantages of the above embodiment are as follows:

Real-time statistics is made on the operation requests of the client for the video data, and the hot video data is selectively backed up. This greatly reduces the cost of the backup of the video data, and relieves the pressure of the capacity and bandwidth resources of the system. Furthermore, this ensures the security of the hot video data, and improves the utilization efficiency of the system resources.

An embodiment of the present disclosure provides a storage medium for storing an executable program code which performs the method of operating the video data storage system provided by the embodiments of the present disclosure when being executed. The video data storage system includes an index server and at least two storage servers for storing video data. The index server stores a first mapping relationship between a camera identification code and a storage server identification code. The storage servers store a second mapping relationship among a camera identification code, a time range of video data and a physical location of the video data in a storage server. The method may include:

making, by the index server, statistics of an operation hot value of video data operated by all clients, according to operation requests from all the clients for the video data;

comparing, by the index server, the operation hot value of the video data with a predetermined first threshold, and if the operation hot value of the video data is larger than the first threshold, sending, by the index server, at least one storage server a backup instruction to instruct the storage server to back up the video data and update the second mapping relationship;

updating, by the index server, the first mapping relationship according to a camera identification code corresponding to the video data and a storage server identification code of the storage server that backs up the video data.

The advantages of the above embodiment are as follows:

Real-time statistics is made on the operation requests of the client for the video data, and the hot video data is selectively backed up. This greatly reduces the cost of the backup of the video data, and relieves the pressure of the capacity and bandwidth resources of the system. Furthermore, this ensures the security of the hot video data, and improves the utilization efficiency of the system resources.

Those skilled in the art can understand that the method embodiments of the present disclosure can be implemented in software, hardware, firmware, and the like. Regardless of whether the disclosure is implemented in software, hardware, or firmware, the instruction code can be stored in any type of computer-readable memory (eg, permanent or modifiable, volatile or non-volatile, solid state or non-solid state, fixed or replaceable media, etc.). Similarly, the memory may be, for example, Programmable Array Logic (PAL), Random Access Memory (RAM), Programmable Read Only Memory (PROM), Read-Only Memory (ROM), Electrically Erasable Programmable ROM (EEPROM), magnetic disk, CD, Digital Versatile Disc (DVD) and so on.

Each unit mentioned in each apparatus embodiment of the present disclosure is a logical unit. Physically, a logical unit may be a physical unit, or may be a part of a physical unit, or may be implemented by a combination of multiple physical units. The physical implementation of these logical units is not the most important, and the combination of the functions implemented by these logical units is the key for solving the technical problems raised by the present disclosure. In addition, in order to present the inventive concept of the present disclosure, the foregoing apparatus embodiments of the present disclosure do not introduce units that are not closely related to the solution of the technical problems raised by the present disclosure, which does not indicate that the above apparatus embodiments do not include other units.

It should be noted that all of the documents mentioned in the present disclosure are hereby incorporated by reference in their entireties, just as each document is individually incorporated by reference in its entirety. In addition, it should be appreciated that various changes and modifications may be made to the present disclosure by those skilled in the art after reading the above-described contents of the present disclosure, and these equivalents also fall within the scope of the appended claims.

Furthermore, the relationship terms used in the specification and claims, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements. In the claims and the specification of the patent, performing an action according to an element means: performing the action at least according to the element. This includes two cases: performing the action only according to the element, and performing the action according to the element and other elements.

Although the present disclosure has been illustrated and described with reference to some preferred embodiments of the present invention, those having ordinary skill in the art should appreciate that various variations may be made thereto in form and details without departing from the spirit and scope of the present disclosure.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A method of operating a video data storage system, wherein the video data storage system comprises an index server and at least two storage servers for storing video data, the index server stores a first mapping relationship between a camera identification code and a storage server identification code, and each of the storage servers stores a second mapping relationship among a camera identification code, a time range of video data and a physical location of the video data in the storage server; and wherein the method comprises:

making, by the index server, statistics of an operation hot value of video data operated by all clients, according to operation requests from all the clients for the video data;

comparing, by the index server, the operation hot value of the video data with a predetermined first threshold, and if the operation hot value of the video data is larger than the first threshold, sending, by the index server, at least one storage server a backup instruction to instruct the storage server to back up the video data and update the second mapping relationship;

updating, by the index server, the first mapping relationship according to a camera identification code corresponding to the video data and a storage server identification code of the storage server that backs up the video data.

2. The method of operating a video data storage system according to claim 1, wherein the video data storage system comprises at least a first storage server and a second storage server, the first storage server corresponds to the first threshold, and the second storage server corresponds to a predetermined second threshold, wherein the second threshold is larger than the first threshold, and a cyclic overwriting period of the second storage server is longer than a cyclic overwriting period of the first storage server; and wherein sending, by the index server, at least one storage server a backup instruction comprises:

if the operation hot value of the video data is larger than the second threshold, sending, by the index server, the second storage server an instruction for backing up the video data and updating the second mapping relationship; or if the operation hot value of the video data is not larger than the second threshold, sending, by the index server, the first storage server an instruction for backing up the video data and updating the second mapping relationship.

3. The method of operating a video data storage system according to claim 1, further comprising:

receiving, by the index server, a retrieval request sent by a client for specified video data, the retrieval request comprising a camera identification code and a time range of the specified video data;

obtaining, by the index server, all target storage servers storing the specified video data, according to the camera identification code and the first mapping relationship;

sending, by the index server, a retrieval instruction to all the target storage servers, to instruct all the target storage servers to retrieve the specified video data according to the camera identification code, the time range of the specified video data, and the second mapping relationship, respectively; and de-duplicating, by the index server, retrieval results returned by all the target storage servers, and outputting a de-duplicated retrieval result.

4. The method of operating a video data storage system according to claim 1, wherein types of the operation requests from all the clients for the video data comprise, but are not limited to, one of or any combination of: retrieval, locking, labelling, downloading, and playback.

5. The method of operating a video data storage system according to claim 1, wherein making, by the index server, statistics of an operation hot value of video data operated by all clients, according to operation requests from all the clients for the video data comprises:

making, by the index server, statistics of operation types and the number of operations of the video data operated by all the clients according to the operation requests from all the clients for the video data, and obtaining the operation hot value of the video data through a weighted average algorithm.

6. A video data storage system, comprising an index server and at least two storage servers, wherein the index server stores a first mapping relationship between a camera identification code and a storage server identification code, and each of the storage servers stores a second mapping relationship among a camera identification code, a time range of video data and a physical location of the video data in the storage server;

the index server comprises:

a statistics module configured for making statistics of an operation hot value of video data operated by all clients, according to operation requests from all the clients for the video data;

a backup module configured for comparing the operation hot value of the video data with a predetermined first threshold, and if the operation hot value of the video data is larger than the first threshold, sending at least one storage server a backup instruction to instruct the storage server to back up the video data and update the second mapping relationship; and a first update module configured for updating the first mapping relationship according to a camera identification code corresponding to the video data and a storage server identification code of the storage server that backs up the video data; and each of the storage servers comprises:

a storage module configured for storing the video data according to the backup instruction of the backup module; and a second update module configured for updating the second mapping relationship according to the backup instruction of the backup module.

7. The video data storage system according to claim 6, wherein the video data storage system comprises at least a first storage server and a second storage server, the first storage server corresponds to the first threshold, and the second storage server corresponds to a predetermined second threshold, wherein the second threshold is larger than the first threshold, and a cyclic overwriting period of the second storage server is longer than a cyclic overwriting period of the first storage server, and wherein the backup module is further configured for: when the operation hot value of the video data is larger than the first threshold, if the operation hot value of the video data is larger than the second threshold, sending the second storage server an instruction for backing up the video data and updating the second mapping relationship; or if the operation hot value of the video data is not larger than the second threshold, sending the first storage server an instruction for backing up the video data and updating the second mapping relationship.

8. The video data storage system according to claim 7, wherein the index server further comprises:

a receiving module configured for receiving a retrieval request sent by a client for specified video data, the retrieval request comprising a camera identification code and a time range of the specified video data;

a first retrieval module configured for obtaining all target storage servers storing the specified video data, according to the camera identification code and the first mapping relationship, and sending a retrieval instruction to all the target storage servers;

an output module configured for de-duplicating retrieval results returned by all the target storage servers, and outputting a de-duplicated retrieval result;

each of the storage servers further comprises:

a second retrieval module configured for receiving the retrieval instruction of the index server, retrieving the specified video data according to the camera identification code, the time range of the specified video data and the second mapping relationship, and sending a retrieval result to the output module of the index server.

9. An index server connected to at least two storage servers, wherein the index server stores a first mapping relationship between a camera identification code and a storage server identification code, and each of the storage servers store a second mapping relationship among a camera identification code, a time range of video data and a physical location of the video data in the storage server, and the index server comprises:

a statistics module configured for making statistics of an operation hot value of video data operated by all clients, according to operation requests from all the clients for the video data;

a backup module configured for comparing the operation hot value of the video data with a predetermined first threshold, and if the operation hot value of the video data is larger than the first threshold, sending at least one storage server a backup instruction to instruct the storage server to back up the video data and update the second mapping relationship; and a first update module configured for updating the first mapping relationship according to a camera identification code corresponding to the video data and a storage server identification code of the storage server that backs up the video data.

10. The index server according to claim 9, wherein the index server is connected to a first storage server and a second storage server, wherein the first storage server corresponds to the first threshold, and the second storage server corresponds to a predetermined second threshold; the second threshold is larger than the first threshold, and a cyclic overwriting period of the second storage server is longer than a cyclic overwriting period of the first storage server; and wherein the backup module is further configured for: when the operation hot value of the video data is larger than the first threshold, if the operation hot value of the video data is larger than the second threshold, sending the second storage server an instruction for backing up the video data and updating the second mapping relationship; or if the operation hot value of the video data is not larger than the second threshold, sending the first storage server an instruction for backing up the video data and updating the second mapping relationship.

11. The index server according to claim 9, further comprising:

a receiving module configured for receiving a retrieval request sent by a client for specified video data, the retrieval request comprising a camera identification code and a time range of the specified video data;

a first retrieval module configured for obtaining all target storage servers storing the specified video data, according to the camera identification code and the first mapping relationship, and sending a retrieval instruction to all the target storage servers; and an output module configured for de-duplicating retrieval results returned by all the target storage servers, and outputting a de-duplicated retrieval result.

12. A non-transitory computer readable storage medium for storing an executable program code, wherein the executable program code is executed to perform the method of operating a video data storage system according to claim 1.

* * * * *